UNITED STATES PATENT OFFICE.

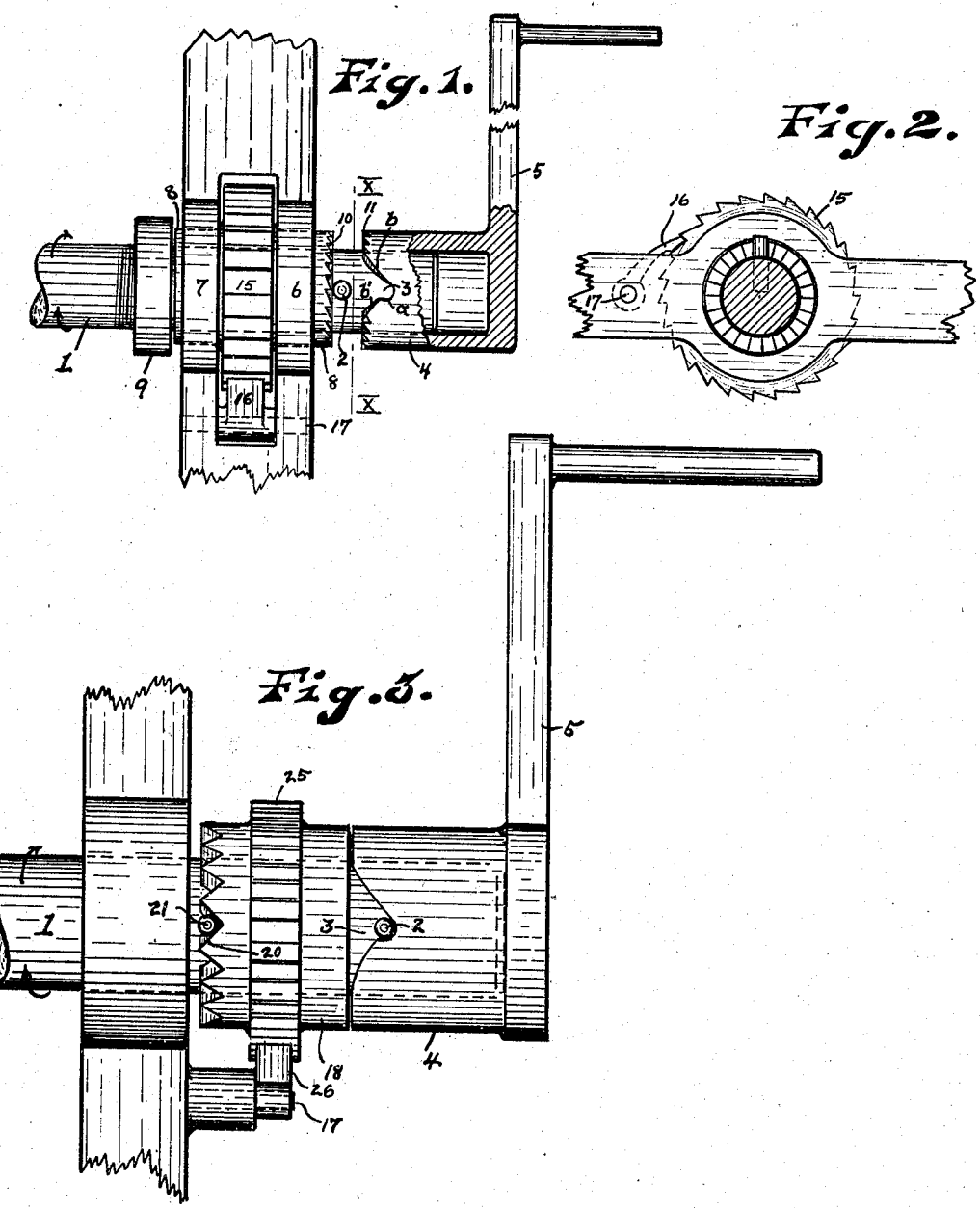

HARRY WAYTE, OF MILWAUKEE, WISCONSIN, ASSIGNOR TO MEYER DESENBERG, JR., OF KALAMAZOO, MICHIGAN.

STARTING DEVICE FOR EXPLOSIVE-ENGINES.

936,964.   Specification of Letters Patent.   Patented Oct. 12, 1909.

Application filed January 5, 1906, Serial No. 294,700. Renewed July 9, 1909. Serial No. 506,845.

*To all whom it may concern:*

Be it known that I, HARRY WAYTE, a citizen of the United States, residing at Milwaukee, county of Milwaukee, and State of Wisconsin, have invented new and useful Improvements in Starting Devices for Explosive-Engines, of which the following is a specification.

My invention relates to improvements in starting devices for internal combustion engines.

The object of my invention is to provide simple and practical means for releasing the crank in case of a premature ignition, whereby injury to the operator will be avoided.

In the following description reference is had to the accompanying drawings in which,—

Figure 1 is a plan view, part in section, of my invention. Fig. 2 is a sectional view drawn on line $x$—$x$ of Fig. 1. Fig. 3 is a plan view showing a modified form of construction.

Like parts are identified by the same reference characters throughout the several views.

1 is the crank shaft of an internal combustion engine.

2 is a pin projecting radially from the shaft and adapted to engage in a notch 3 formed in the edge of a hub 4 of the manually actuated crank 5. The notch 3 is provided with a straight edge $a$ and inclined edges $b$ $b'$, the inclined edge $b$ is adapted to be engaged by the pin 2 when the engine is properly started, the pin 2 being adapted to push the crank hub outwardly by pressing upon the angular surface $b$.

6 and 7 are bearing rings through which the crank shaft 1 passes, and 8 is a sleeve encircling the shaft and extending through the bearing rings.

A screw threaded collar 9 is adjusted to the crank shaft and forms an abutment for the sleeve 8, the other end of the sleeve being formed with ratchet teeth 10 adapted to be engaged by counterpart teeth 11 on the hub 4. The ratchet teeth on the sleeve 8 are inclined in the opposite direction from that of normal shaft rotation.

Between the bearing rings 6 and 7 is a ratchet wheel 15 fast on the sleeve 8 with teeth also inclined in the direction opposite that of normal shaft rotation, and adapted to be engaged by a dog 16, which is pivotally connected with the frame at 17.

In operation when the crank hub 4 is adjusted to engage the pin 2 against the straight edged surface $a$, the teeth 11 will engage the teeth 10 on the sleeve 8, whereby sleeve 10 will be turned with the crank and crank shaft 1. In case of a premature ignition in the engine cylinder, the motion of crank shaft 1 will be reversed. Dog 16 however prevents backward rotation of the sleeve 8 and the teeth 10 acting upon the inclined surfaces of the teeth 11 are therefore made effective to crowd the crank hub outwardly from the pin 2 until the pin is disengaged from the surface $a$ of the notch and bears upon the surface $b'$ after which the continued movement of the pin will be effective to also crowd the crank hub outwardly until released.

Referring to Fig. 3 it will be observed that the sleeve 18 similar to sleeve 8, is provided with teeth 20, the sides of which are inclined in opposite directions from the axis of the crank shaft 1, the crank shaft being provided with a pin 21 in addition to the pin 2. The mutually engaging teeth 10 and 11 of the sleeve and crank hub respectively are omitted in this construction. Ratchet teeth 25 are provided on the sleeve 18 in operative relation to a dog 26, the arrangement being similar to that of the ratchet member 15 and dog 16 of Figs. 1 and 2. The ratchet teeth 25 are formed on a projecting annulus on the sleeve 18, the sleeve and teeth constituting a ratchet member. It will be observed that the hub 4 of the crank abuts the sleeve 18 when the pin 2 is engaged against the straight sided portion of the notch 3 and that one edge of the notch extends angularly from the base of the notch in the direction of shaft rotation. The outer edge of the notch 3 is substantially parallel with the shaft axis at the base of the notch, thus allowing the crank hub to grip the pin 2 and actuate the shaft 1. The other edge of the notch 3 is substantially extends divergently or angularly in a direction opposite that of normal shaft rotation. With this construction when the crank shaft 1 is actuated from the engine in either direction, the pin 21, acting upon the teeth 20, crowds the sleeve 18 outwardly toward the end of the crank shaft and as the outer end of this sleeve abuts the hub 4, the latter is also pushed outwardly to disengage it from the pin 2 or move it sufficiently so that the pin 2 no longer bears upon the straight sided portion at the base of the notch 3.

Having thus described my invention what I claim as new and desire to secure by Letters Patent is,—

1. The combination with a crank shaft having a radially projecting pin, of a crank having a hub provided with a notch adapted to receive said pin, the notch having a straight side edge near its base and an opposing side edge extending outwardly and divergently therefrom; a ratchet member loose on the shaft and provided with teeth on one side face and also upon its outer surface; a relatively fixed pawl adapted to engage the teeth on the outer surface of the sleeve; and a projection on the shaft loosely engaging between the teeth on the side face of the sleeve; said teeth having inclined surfaces and said sleeve being free to move longitudinally to push the crank hub from said pin.

2. The combination with a crank shaft having radially projecting pins, of a sleeve loosely mounted on said shaft and provided with teeth having tapered sides normally engaging one of said pins, peripheral ratchet teeth on said sleeve, a dog mounted on a stationary support and engaging said ratchet teeth, said dog being arranged to prevent the rotation of the sleeve in a direction opposite to that of normal shaft rotation, together with a crank having a hub provided with a notch adapted to receive the other pin when the hub is in a position abutting said sleeve.

3. The combination of a crank shaft having a pair of rigid radial projections, a sleeve loosely mounted on the shaft between the projections, and having an angular face at one end adapted to engage the corresponding projection, means for holding said sleeve against rotation in a direction opposite to that of normal shaft rotation, and a crank having a hub provided with a notch adapted to receive the other shaft projection when adjusted to the end of the shaft in a position to abut said sleeve.

4. The combination of a crank shaft having a pair of rigid radial projections, a sleeve loosely mounted on the shaft between the projections, and having angularly divergent faces at one end adapted to receive the adjacent shaft projection between them, means for holding said sleeve against rotation in a direction opposite to that of normal shaft rotation and a crank having a hub provided with a notch adapted to receive the other shaft projection when adjusted to the end of the shaft in a position to abut said sleeve.

In testimony whereof I affix my signature in the presence of two witnesses.

HARRY WAYTE.

Witnesses:
  LEVERETT C. WHEELER,
  PEARL GROBBEN.